United States Patent [19]
Handelsman

[11] Patent Number: 6,112,703
[45] Date of Patent: Sep. 5, 2000

[54] SHROUDED CHEWABLE PET TOYS AND METHOD OF MAKING

[75] Inventor: Simon Handelsman, Newburyport, Mass.

[73] Assignee: JW Pet Company, Inc., Hasbrouck Heights, N.J.

[21] Appl. No.: 09/338,138

[22] Filed: Jun. 22, 1999

[51] Int. Cl.⁷ .............................. A01K 29/00; A63H 3/06
[52] U.S. Cl. ........................... 119/707; 119/709; 446/221
[58] Field of Search ..................... 119/707, 702, 119/708, 709, 710, 711, 712; 446/183, 184, 188, 193, 197, 198, 221; D30/160; 473/594, 603, 604

[56] References Cited

U.S. PATENT DOCUMENTS

| | | |
|---|---|---|
| 1,861,948 | 7/1932 | Barkdoll . |
| 2,619,257 | 11/1952 | Posner . |
| 2,668,394 | 2/1954 | Auzin . |
| 3,315,640 | 4/1967 | Gamble . |
| 3,830,202 | 8/1974 | Garrison .................. 119/709 |
| 4,106,769 | 8/1978 | Manska .................... 473/594 |
| 4,803,953 | 2/1989 | Graves ..................... 119/707 |
| 4,991,847 | 2/1991 | Rudell et al. .............. 273/138.1 |
| 5,009,193 | 4/1991 | Gordon ..................... 119/711 |
| 5,092,272 | 3/1992 | O'Rourke .................. 119/709 |
| 5,357,904 | 10/1994 | Takahashi et al. ........ 119/708 |
| 5,415,132 | 5/1995 | Meyer ..................... 119/707 |
| 5,419,730 | 5/1995 | Diresta et al. ............. 446/193 |
| 5,462,473 | 10/1995 | Sheller .................... 446/183 |
| 5,476,408 | 12/1995 | Hoeting et al. ............ 446/419 |
| 5,560,320 | 10/1996 | Plunk ..................... 119/709 |
| 5,809,938 | 9/1998 | Baiera et al. ............. 119/707 |
| 5,870,971 | 2/1999 | Krietzman et al. .......... 119/707 |
| 5,891,000 | 4/1999 | Phillips ................... 482/49 |
| 5,895,308 | 4/1999 | Spector ................... 446/397 |
| 5,921,840 | 7/1999 | Diresta et al. ............. 446/198 |
| 5,924,908 | 7/1999 | O'Heir .................... 446/168 |

*Primary Examiner*—Peter M. Poon
*Assistant Examiner*—Yvonne R. Abbott
*Attorney, Agent, or Firm*—Helfgott & Karas, PC

[57] ABSTRACT

A chewable pet toy is provided with an outer shell molded from a durable semi-rigid material such as vinyl plastic. The shell partially covers an inner bladder formed of a less durable and softer material such as latex rubber. The bladder can be held within the sleeve with a simple resilient interference fit.

27 Claims, 5 Drawing Sheets

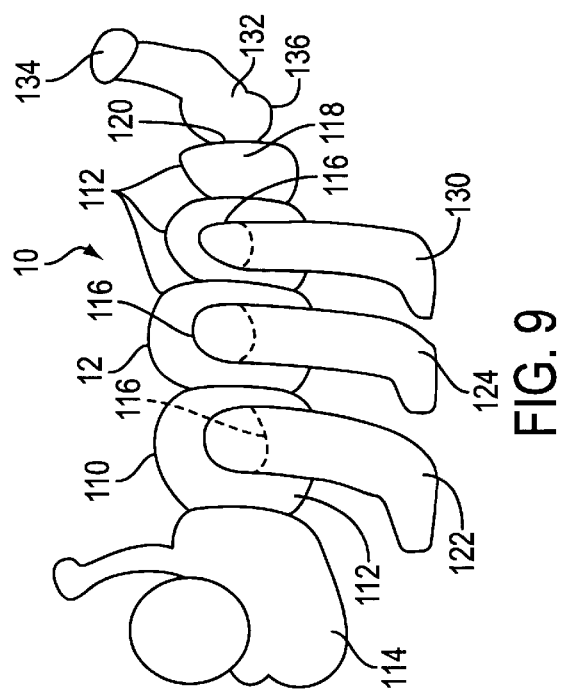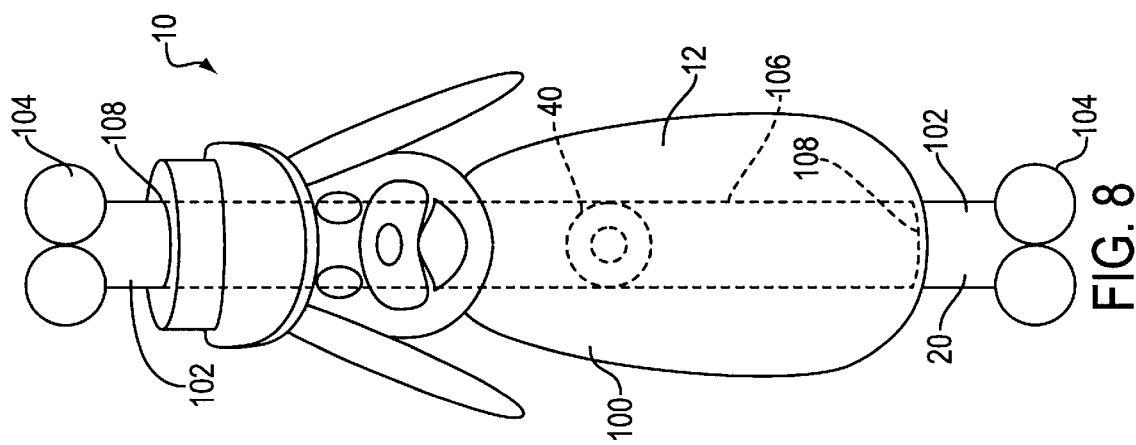

6,112,703

SHROUDED CHEWABLE PET TOYS AND METHOD OF MAKING

BACKGROUND OF THE INVENTION

1. Field of the Invention

The present invention relates in general to chewable pet toys and in particular to such toys constructed with a soft chewable portion and a more durable protective portion.

2. Description of Prior Developments

Pet chew toys have long been available in numerous sizes, shapes and materials. It is well known that latex rubber is a highly desirable material to use in making pet chew toys, but unfortunately latex rubber is not as aesthetically pleasing to human consumer. As such, latex rubber pet chew toys are less popular.

Although vinyl plastic material is much more durable and rigid than latex rubber and has been used in the manufacture of pet chew toys, pets such as dogs do not seem to enjoy chewing on the harder vinyl material as much as on the softer latex material.

Another drawback associated with purely latex chew toys is their inability to provide protection to relatively delicate whistles and noisemaker assemblies that are often molded within such toys. As soon as a dog bites on a whistle, it is usually damaged or destroyed.

Accordingly, a need exists for a pet chew toy having a soft chewable portion yet which is also durable and at least in part resistant to chewing and abrasion.

Another need exists for such a toy which provides long lasting protection to molded-in whistles and noisemakers.

SUMMARY OF THE INVENTION

The present invention has been developed to fulfill the needs noted above and therefore has as an object the provision of a pet chew toy formed in part by a soft, highly chewable, latex rubber material and in part by a protective, harder vinyl plastic material.

Another object of the invention is the provision of a protective shroud of semi-rigid vinyl material around a portion of a soft bladder-like latex rubber molding.

Still another object of the invention is the provision of a chewable pet toy having a soft latex portion molded around a whistle or noisemaker, and a protective sheath covering and protecting both the latex portion and the whistle from damage due to chewing and biting.

Yet another object of the invention is to provide a pet chew toy having a soft latex rubber bladder held within a semi-rigid sleeve of plastic material with a resilient interference fit.

These and other objects are met by the present invention which is directed to a chewable pet toy having a soft chewable latex rubber portion and a semi-rigid shroud of vinyl plastic forming a protective shell around a portion of the latex rubber portion. Many different toy shapes and sizes can be adopted in accordance with the invention.

The latex portion of each toy is molded as a highly flexible hollow body having a thin wall thickness preferably less than 0.1 inch thick and more preferably less than about 0.50 inch. A preferred latex body can be formed with a wall thickness and consistency similar to that of common household latex rubber heavy duty cleaning gloves. That is, the latex body should be able to support the weight of the toy without collapsing, yet be easily collapsed with a light manual squeeze or pinch between one's fingers and thumb.

With this design, a pet can actively chew on a toy and even destroy a portion of the toy without destroying the entire toy. An advantage of the invention is the provision of several chewable latex rubber extremities on each toy, so that if one extremity is damaged or destroyed, a pet can still chew on the remaining extremity or extremities.

The vinyl plastic shroud is molded separately from the latex rubber portion which is subsequently stuffed, stretched and/or inserted within the shroud. In many toy designs according to the invention, the collapsibility of the thin walled latex rubber portion is relied upon to stretch the rubber latex though relatively small clearance holes in the vinyl plastic shroud. No additional fasteners are required in most cases because once the latex is stretched through a clearance opening in the plastic shroud, the latex expands and returns to its original shape and prevents the latex portion from being easily removed from the shroud.

Another advantage of the invention is the protection of whistles and similar noisemakers which are typically insert-molded into a latex toy. Once chewed, these whistles are commonly destroyed. However, by locating the whistle within the vinyl shroud, they are protected and can last for a longer time than if left unprotected.

The aforementioned objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS

In the drawings:

FIG. 8 is a perspective view of a fifth embodiment of the invention;

FIG. 9 is a side elevation view of a sixth embodiment of the invention;

In the various figures of the drawings, like reference characters designate like parts.

DETAILED DESCRIPTION OF THE PREFERRED EMBODIMENTS

Figure 1:
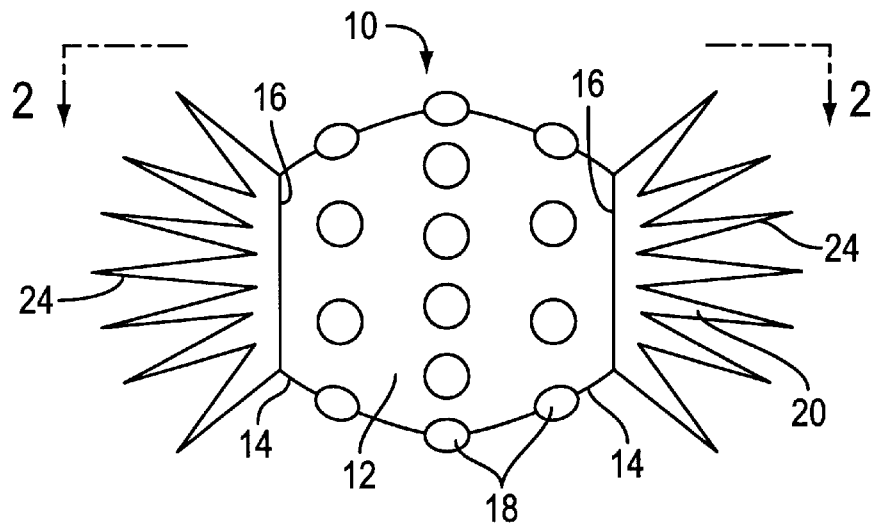
FIG. 1 is a front elevation view of a chewable pet toy constructed in accordance with a first embodiment of the invention.

The present invention will now be described in connection with the drawings, beginning with FIGS. 1 and 2 which show a pet toy 10 constructed in accordance with a first embodiment of the invention. Toy 10 includes a generally spherical or spheroid hollow shroud or shell 12 formed of semi-rigid molded vinyl plastic. Of course, other semi-rigid plastic materials can be used. Shell 12 has a pair of opposed truncated end portions 14 defining a pair of circular outer rims 16.

Projections, such as bumps or domes 18 can be molded on the surface of shell 12 to stimulate chewing and improve gripping within a dog's mouth. Shell 12, as seen in FIG. 2, is relatively thin walled, yet due to the rigidity of vinyl plastic, the shell is relatively difficult to deform with finger strength alone.

A soft latex rubber bladder 20 is held within the hollow shell 12 with a simple resilient friction fit. Bladder 20 is formed with a central hollow chamber 22 bordered on opposite sides by first and second sets of fingers or spikes 24 arrayed in a pattern similar to the spikes found atop a pineapple. One set of soft spikes 24 is circumferentially squeezed and inserted into a frusto-conical opening 28 extending inwardly from rim 16 on hollow shell 12.

Once one set of the soft pliable spikes is inserted into shell 12, the central bulbous portion 30 of bladder 20 is circumferentially compressed, pushed and squeezed into the inner chamber 32 of shell 12, until its annular waisted or necked-down collar portion 34 resiliently snaps into position around one of the circular inner rims 36 on opening 28. This spikes inside the shell are then pulled through the other opening so that one set of spikes projects outwardly from each end portion 14. In this manner, a two piece assembly is easily constructed without the need for additional fasteners.

If soft bladder 20 is destroyed by chewing, it can be easily replaced by a simple manual removal and replacement procedure. One or more soft replacement bladders 20 can be provided with each shell 12. The replacement bladder may have the same or a different shape from the original bladder.

Figure 2:
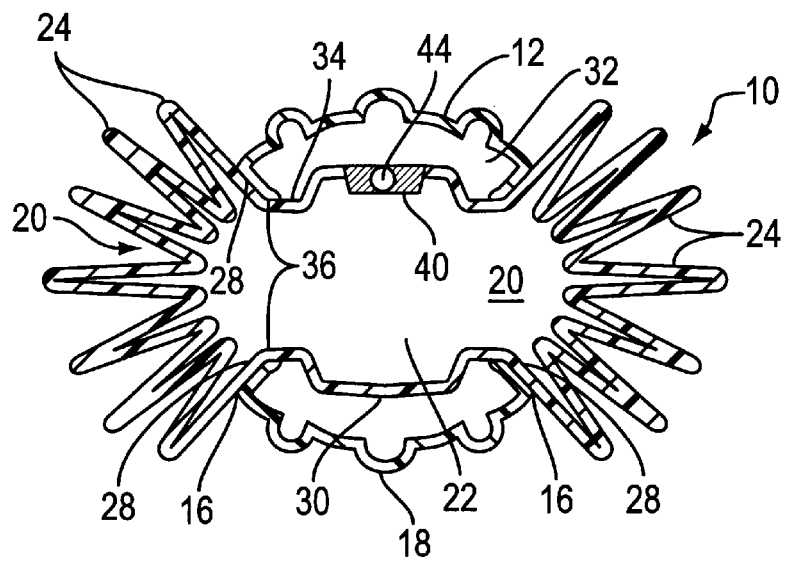
FIG. 2 is a view in section taken through line 2—2 of FIG. 1.

As further seen in FIG. 2, a whistle or noisemaker 40 is insert molded within the wall 42 of the bulbous portion 30 of bladder 20. When a pet bites down on shell 12 and compresses the shell onto bladder 20, air from within the bladder is forced out of chamber 22 through noisemaker orifice 44. However, because the vinyl shell 12 is relatively rigid, it protects the whistle or noisemaker from damage.

Figure 3:
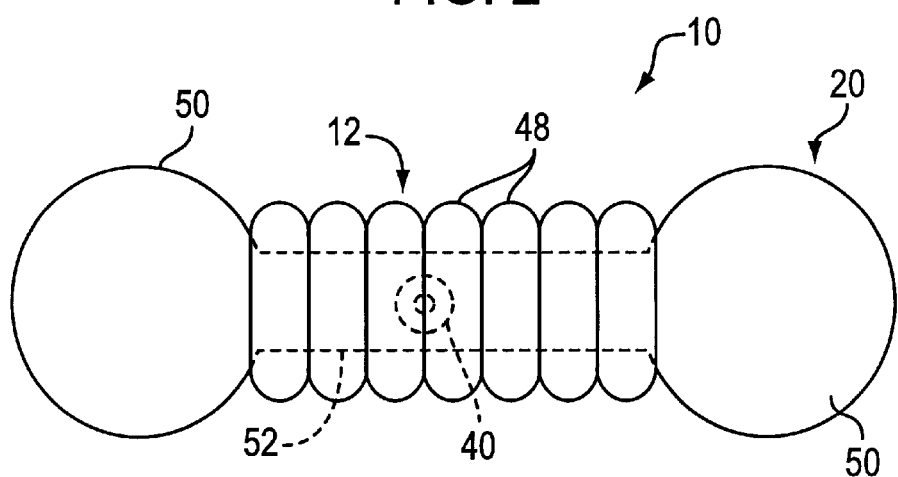
FIG. 3 is a front elevation view of a second embodiment of the invention.

A second embodiment of the invention is shown in FIG. 3 wherein a protective shroud or shell 12 is provided in the form of a series of juxtaposed hollow rings or toroids 48. Each ring 48 is formed of semi-rigid vinyl plastic material to provide a protective covering or sheath around a relatively soft and less durable latex rubber bladder 20.

Bladder 20 is molded in the shape of a dumbbell, with a bulbous or spherical hollow head portion 50 located on each end of a hollow central cylindrical shaft or tube 52. A noisemaker 40 is insert molded within the wall of shaft 52 and surrounded and protected by one or more of the hollow rings 48.

The assembly of shell 12 on bladder 20 of FIG. 3 is extremely easy. The rings 48 are simply forced over one of the head portions 50 in the fashion of beads being strung on a string. Of course, head portion 50 must be resiliently compressed radially inwardly as each ring is slipped over the head portion. Once each ring passes over head portion 50, the head portion resiliently expands outwardly to securely hold each ring on shaft 52 between the opposed head portions 50.

Figure 4:
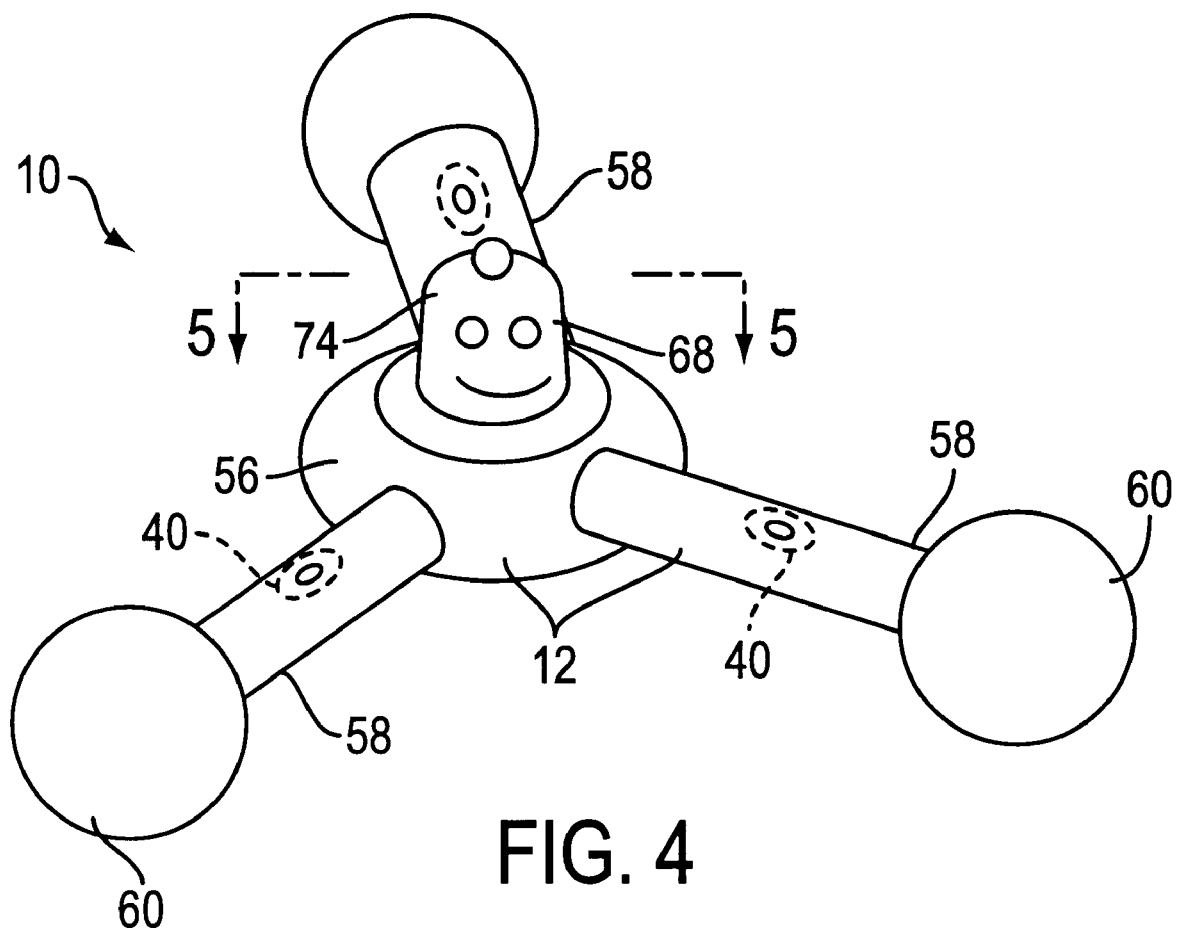
FIG. 4 is a perspective view of a third embodiment of the invention.
Figure 5:
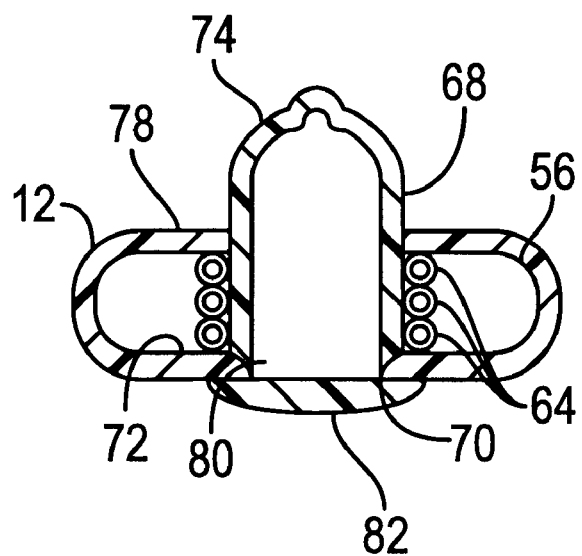
FIG. 5 is a view in section taken through line 5—5 of FIG. 4.
Figure 6:
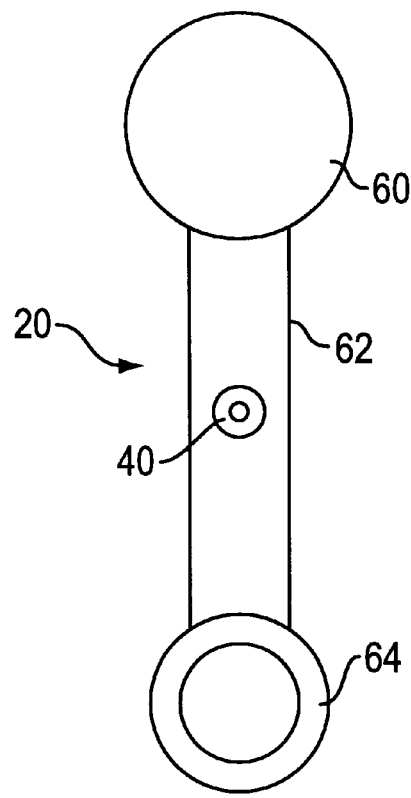
FIG. 6 is a view of one of the spokes of FIG. 5.

A third embodiment of the invention is shown in FIGS. 4, 5 and 6 wherein a protective vinyl plastic shell 12 is molded in the form of a central hollow disc body 56 with three hollow cylindrical tubular vinyl plastic spokes or arms 58 homogeneously molded around the circumference of disc 56. The cantilevered arms 58 are symmetrically spaced 120 degrees apart around disc 56, which acts as a central support or hub for the spokes or arms 58.

A bladder 20, as seen in FIGS. 4 and 6, is resiliently inserted into each arm 58 and into the center of disc 56. Each hollow latex rubber bladder 20 is molded with a bulbous or spherical head portion 60 which is homogeneously connected to one end of a hollow shaft 62. A hollow ring or loop 64 is molded homogeneously to the other end of shaft 62 and noisemaker 40 is insert molded in each shaft 62.

As seen in FIG. 5, once each loop 64 on each bladder 20 is pulled, pushed or otherwise squeezed through the free end of each arm 58 and centrally aligned within the disc 56, a hollow vinyl plastic center plug 68 is inserted through a bottom opening 70 formed in the center of floor 72 of disc 56. Plug 68 is then pushed through each loop 64 to centrally position, align and hold each bladder 20 within the disc-shaped shell 12. The plug 68 has a dome-shaped top 74 which is pushed through opening 76 in roof 78 of disc 56. An annular groove 80 is formed around the bottom of plug 68 and snaps into place onto the floor 72 of disc 68 adjacent bottom opening 70. A circular cap 82 prevents the plug 68 from passing completely through opening 70.

Figure 7:
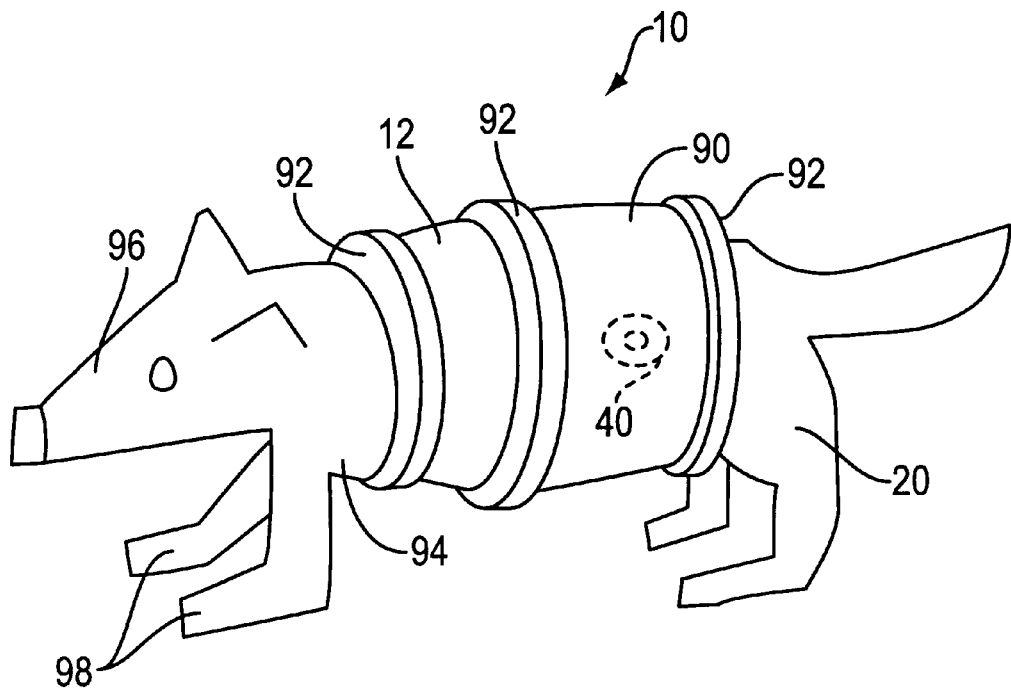
FIG. 7 is a perspective view of a fourth embodiment of the invention.

A fourth embodiment of the invention is shown in FIG. 7 wherein a vinyl plastic shell 12 is formed as a tubular sleeve 90. Sleeve 90 is a thin-walled molding shaped with a barrel contour. Annular flanges 92 are molded around opposite ends of sleeve 90 and around the central portion of sleeve 90 to provide strength and rigidity to the sleeve.

A thin, highly flexible latex rubber hollow bladder 20 is molded in the shape of an animal, such as a dog 94. The bladder 20 is squeezed and pulled through the sleeve 90 until the head 96 and front legs 98 pop out of the front end of sleeve 90 and the rear legs 100 extend out of the opposite rear end of sleeve 90.

A noisemaker 40 is insert molded on the central body portion of dog 94 and covered and protected by the barrel-shaped sleeve 90. The bladder 20 can be easily inserted and removed from the barrel-shaped sleeve 90 without the bother of tools or fasteners.

A variation of the embodiment of FIG. 7 is shown in FIG. 8 wherein a hollow shell 12 is molded of a vinyl plastic material in the shape of an animal such as a dog 100. Bladder 20 is molded of a soft latex rubber material in the shape of a hollow dog bone 102. Bladder 20 is squeezed and pushed and/or pulled through sleeve 12 until the bulbous condyles 104 molded on each end of bone shaft 106 extend through openings 108 on opposite ends of sleeve 12.

Figure 10:
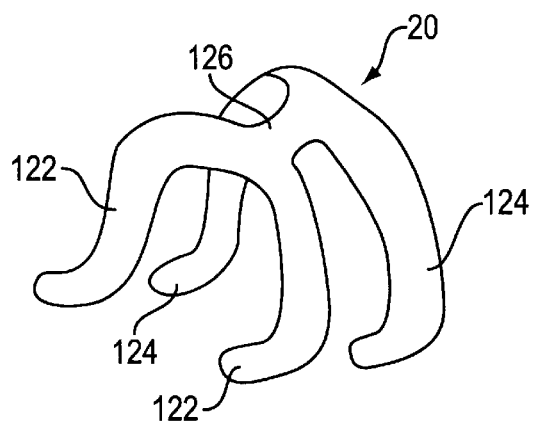
FIG. 10 is a perspective view of the front leg assembly of the toy insect of FIG. 9.
Figure 11:
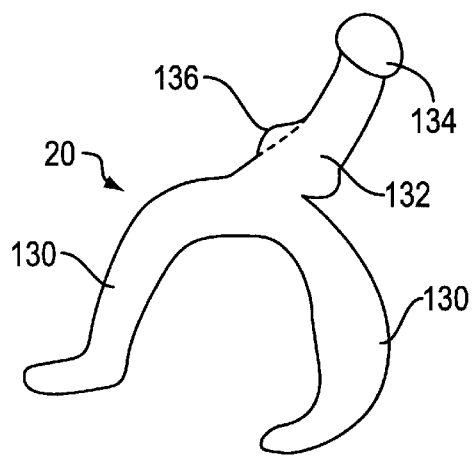
FIG. 11 is a perspective view of the rear leg assembly of the toy insect of FIG. 9.

Another embodiment of the invention is shown in FIGS. 9, 10 and 11 wherein a vinyl plastic shell 12 is molded in the shape of a hollow insect body 110. Body 110 is formed with a series of bulbous body segments 112 and bulbous hollow head 114 representative of a caterpillar. Several of the body segments 112 are formed with lateral opposed pairs of openings 116 and the rearmost segment 118 is formed with a rearwardly-facing opening 120.

Two hollow bladders 20 adapted for insertion within insect body 110 are shown in FIGS. 10 and 11. In FIG. 10, a set of four insect legs is molded of soft latex rubber. A front pair of hollow legs 122 is connected to a rear pair of hollow legs 124 by a hollow spine 126. In FIG. 11, a pair of hollow hind legs 130 is molded homogeneously along with a hollow tail 132. Tail 132 includes a hollow bulbous end portion 134.

As in the previous embodiments, the leg-shaped bladders 20 of FIGS. 10 and 11 are inserted within the shell or sleeve 12 of FIG. 9. The legs of FIG. 10 are stuffed into and pulled through the openings 116 in forward body segments 112 and the legs and tail of FIG. 11 are stuffed into and pulled through the openings 116 in the rearward body segment 116. The tail 132 is pulled though opening 120.

In each case, the legs and tail are resiliently and frictionally held in place by elastic deformation of the latex rubber against the more rigid vinyl plastic shell. A bulbous enlargement 136 may be formed at the base of tail 132 to hold the tail in place on segment 118.

Figure 12:
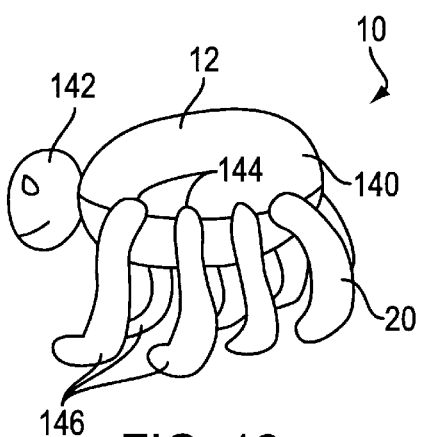
FIG. 12 is a perspective view of a seventh embodiment of the invention.

A final illustrative embodiment of the invention is shown in FIG. 12 wherein vinyl shell 12 is shaped as a hollow, oblate spheroid spider body 140 having a hollow head 142. Round openings 144 are formed around the opposite lateral sides of body 140. Bladder 20 of latex rubber is molded as a set of eight hollow legs 146 which are stuffed and pulled through openings 144 in body 140.

There has been disclosed heretofore the best embodiment of the invention presently contemplated. However, it is to be understood that the various changes and modifications may be made thereto without departing from the spirit of the invention.

What is claimed is:

1. A chewable pet toy, comprising:
    a hollow protective shell having at least one passage defined therethrough, said hollow protective shell formed of a durable semi-rigid plastic material that is relatively difficult to deform with finger strength alone; and
    a hollow bladder having enlarged end portions adapted to be chewed by a pet and formed of a soft rubber material, said bladder being further adapted to be removably inserted through said at least one passage such that said enlarged end portions extend beyond said at least one passage and prevent separation of said bladder from said protective shell during use, a portion of said bladder being covered in part by said protective shell.

2. The pet toy of claim 1, wherein said semi-rigid plastic material comprises vinyl plastic.

3. The pet toy of claim 1, wherein said soft rubber material comprises latex rubber.

4. The pet toy of claim 1, wherein said semi-rigid plastic material comprises vinyl plastic and said soft rubber material comprises latex rubber.

5. The pet toy of claim 1, further comprising a noisemaker provided on said bladder and wherein said noisemaker is covered by said shell.

6. The pet toy of claim 1, wherein said shell comprises a hollow spheroid having a pair of opposed openings formed therein.

7. The pet toy of claim 1, wherein said second enlarged end portions of said bladder comprises a plurality of spikes projecting outwardly from said shell.

8. The pet toy of claim 1, wherein said bladder is held within said shell by resilient deflection of said bladder against said shell.

9. The pet toy of claim 1, wherein said shell comprises a series of juxtaposed hollow rings.

10. The pet toy of claim 1, wherein said bladder second enlarged end portions of said bladder comprise a pair of hollow spheres molded on opposite ends of a hollow shaft.

11. The pet toy of claim 1, wherein said shell comprises a hollow central body and a plurality of hollow tubes radiating outwardly from said central body.

12. The pet toy of claim 1, wherein said bladder comprises a plurality of hollow bladders each having an enlarged hollow bulbous head connected to a first end of a hollow shaft and a hollow ring connected to a second opposite end of said hollow shaft.

13. The pet toy of claim 1, wherein said shell comprises a hollow disc.

14. The pet toy of claim 1, further comprising a plug inserted into said hollow shell and connecting said bladder to said hollow shell.

15. The pet toy of claim 1, wherein said bladder is formed in the shape of an animal.

16. The pet toy of claim 1, wherein said shell is formed as an opened-ended sleeve.

17. The pet toy of claim 1, wherein said bladder is formed in the shape of a bone having a hollow shaft and a pair of condyles formed on opposite ends of said shaft.

18. The pet toy of claim 1, wherein said shell is formed in the shape of an insect body.

19. The pet toy of claim 1, wherein said bladder is formed as a plurality of hollow legs.

20. The pet toy of claim 1, wherein said bladder comprises a hollow animal tail.

21. A method of making a chewable pet toy comprising the steps of:
    providing a first member having at least one passage defined therethrough;
    providing a second member having enlarged end portions with one of said first and second members being of semi-rigid, plastic material and the other being of a compressible material;
    deforming a portion of said member of compressible material such that a portion of said second member extends through said passage of said first member with said enlarged end portions extending beyond said at least one passage to prevent removal of said second member from said first member.

22. A method in accordance with claim 21, wherein said semi-rigid plastic material comprises vinyl plastic.

23. A method in accordance with claim 21, wherein said compressible material comprises latex rubber.

24. A method in accordance with claim 21, further comprising the step of providing a noisemaker on said second member and wherein said noisemaker is covered by said first member.

25. A chewable pet toy, comprising:
    a first member having at least two openings with a passage defined therethrough, said first member being adapted to be chewed by a pet, and
    a second member having a first portion adapted to be received through said passage and covered in part thereby, and an exposed, enlarged second portion extended outside said first member adjacent said at least two openings and adapted to be chewed by a pet, said enlarged second portion being further adapted to prevent separation of said first and second members,
    wherein one of said first and second members being formed of a durable semi-rigid material that is relatively difficult to deform with finger strength alone and the other being formed of a substantially hollow compressible material.

26. A chewable pet toy in accordance with claim 25, wherein said first portion of said second member further comprises a noisemaker disposed therein.

27. A chewable pet toy in accordance with claim 26, wherein said second member is compressible and said noisemaker is protected by said first member and sounds upon compression of said exposed, enlarged portion of said second member.

* * * * *